United States Patent
Akeley

(10) Patent No.: US 6,226,003 B1
(45) Date of Patent: May 1, 2001

(54) METHOD FOR RENDERING SILHOUETTE AND TRUE EDGES OF 3-D LINE DRAWINGS WITH OCCLUSION

(75) Inventor: Kurt Akeley, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/132,691

(22) Filed: Aug. 11, 1998

(51) Int. Cl.$^7$ ........................................... G06F 15/00
(52) U.S. Cl. ................................................. 345/419
(58) Field of Search ................................... 345/422, 421, 345/419, 418, 113, 114

(56) References Cited

U.S. PATENT DOCUMENTS

| | | | |
|---|---|---|---|
| 5,144,291 | * 9/1992 | Nashizawa | 345/422 |
| 5,175,805 | * 12/1992 | Carrie | 345/422 |
| 5,265,198 | * 11/1993 | Gonzalez-Lopez et al. | 345/422 |
| 5,271,094 | * 12/1993 | Albaugh et al. | 345/422 |
| 5,309,550 | * 5/1994 | Takahashi | 345/422 |

* cited by examiner

*Primary Examiner*—Phu K. Nguyen
(74) *Attorney, Agent, or Firm*—Wagner, Murabito & Hao LLP

(57) ABSTRACT

A computer-implemented method for generating three dimensional line drawings in which only silhouette edges and true edges that are visible are displayed. The color, depth, and stencil buffers are respectively initialized to background color, farthest value, and zero. In a first pass, all polygons are rendered by filling all pixels within their boundaries. At each pixel, only its depth value is modified by selecting the nearer of either the current depth value or the new depth value. This creates a depth image in the depth buffer used for occlusion detection. In a second pass, all the polygons of a particular orientation are rendered by drawing lines from vertex to vertex for each of the polygons. The pixel values are modified only when the depth comparison passes (i.e., the pixel is visible and not occluded). Each time a particular pixel is modified, its corresponding stencil value is toggled from 0 to 1 or from 1 back to 0. Afterwards, the value of each pixel in the frame buffer is set to the line color if and only if its corresponding stencil value is 1. Lastly, all true edges are rendered. For the true edges, only those pixels which pass the depth comparison are modified by setting them to the line color. In the end, only the visible true edges and silhouette edges are drawn for display.

18 Claims, 11 Drawing Sheets

100

100

200

200

METHOD FOR RENDERING SILHOUETTE AND TRUE EDGES OF 3-D LINE DRAWINGS WITH OCCLUSION

FIELD OF THE INVENTION

The present invention pertains to a method for rendering high-quality computer generated 3-D line drawings that display only the visible true edges and silhouette edges.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps storing the results in a magnetic disk drive. However, today's computer systems are much more advanced, versatile, and sophisticated. Computers are now commonly called upon to render realistic computer-generated three-dimensional graphic images. This is accomplished by transforming real world three-dimensional objects into two-dimensional models having the illusion of depth. These models are then rendered by the computer for display onto a computer screen. Additional processing relating to color, lighting effects, textures, and depth comparisons are performed in order to render extremely realistic solid images. In the end, viewers are treated to highly realistic and visually stunning computer-generated displays. Some applications in which three-dimensional graphics play a vital role include computer-aided design and manufacture, special effects for movies, simulations, medical diagnostics, etc.

However, in some instances, it is preferable to display simple line drawings to better represent a particular three-dimensional object rather than the more sophisticated shaded surface representation. This is attributable to the fact that most people have familiarity and feel comfortable with working in terms of line drawings. For instance, when asked to draw a house, most people would draw the familiar figure of a triangle placed on top of a rectangle. Indeed, it is easier under certain circumstances for engineers and designers to visualize a simplified, streamlined line drawing instead of its corresponding shaded surface picture. Line drawings contain basic, artistically useful information. Often, particular aspects of a design or layout become more readily apparent in a line drawing as opposed to that of a solid surface representation.

Unfortunately, there is one major problem associated with line drawings. The problem is that displaying all of the lines associated with an object typically results in an overly crowded and oftentimes jumbled picture. This problem is especially acute for objects which happen to be complex in nature (e.g., a jet engine). As an example, FIG. 1(A) shows all of the lines corresponding to a simple line drawing of a house. In comparison, FIG. 1(B) shows the same line drawing, except that all "hidden" lines have been removed. This type of drawing is commonly referred to as a "hidden-line" rendering. Hence, displaying all of the lines is undesirable as it might actually serve to confuse the viewer. Removing the hidden lines makes it easier to recognize the shape or silhouette of an object.

Further exacerbating this problem relates to the way in which computers handle curved surfaces. Basically, a three-dimensional object is initially modeled as a "wire mesh" frame. The wire mesh frame is made up of a number of adjoining polygons (e.g., triangles). The polygons are defined by their vertices (e.g., a triangle is defined by its three vertices). Hence, an object can be moved, rotated, and scaled by merely manipulating the coordinates of the vertices corresponding to the polygons. Texture may then be mapped onto the polygons to give the object the appearance of solidity. With this type of polygonal graphics scheme, curved surfaces are modeled as a number of flat facets. The facets are comprised of one or more polygons. For example, FIG. 2(A) depicts how a cylinder is modeled by defining a number of facets. The two end caps are represented by a number of triangles. The cylindrical body is represented by adjoining facets in the shape of flat, long, rectangular strips, each of which is comprised of two triangles. Hence, in a standard line drawing, the edges of these facets are displayed. Displaying all facet edges tends to make line drawings even more cluttered and confusing. Consequently, an ideal hidden-line drawing would display only the visible real edges between distinct surfaces and the visible facet edges which are silhouette edges. A clearer hidden-line drawing of a cylinder is shown in FIG. 2(B). The two caps 201–202 correspond to real edges while lines 203–204 correspond to silhouette facet edges.

In the past, software have been developed which attempted to solve this problem. The software would take a given line drawing and proceed to eliminate superfluous lines in an effort to render a simpler, silhouette image. However, this approach suffers from several shortcomings. Namely, the resultant silhouette image was limited to a single point of view. If one were to view the generated silhouette image from a different viewpoint, it would be incorrect. This is due to the fact that the resultant silhouette image was generated based on a particular viewpoint. Straying from the initial point of view from which the silhouette image was generated results in greater and greater inaccuracies. Consequently, if a viewer desires to view the object from different angles, he or she must run the line drawing through the software algorithm for each and every different viewpoint. Since the software algorithm is rather lengthy and complex, having to run the software algorithm each time the viewpoint changes is time consuming, unwieldy, and frustrating.

Thus, there is a need for some method which is accurate and which also has the capability of interactively identifying and displaying only the true edges and silhouette edges of a line drawing which are also visible. The present invention provides an elegant solution which is fast, accurate, and relatively inexpensive to implement. As such, a graphics subsystem utilizing the present invention would have the ability to render smooth, highly accurate 3-D line drawings which only show visible silhouette images in real time, even in response to shifts in the viewpoint.

SUMMARY OF THE INVENTION

The present invention pertains to an efficient, cost-effective method for generating accurate 3-D line drawings in which only silhouette edges and true edges that are visible are displayed. This is accomplished by first initializing the color, depth, and stencil buffers. The color buffer is cleared to a background color; the depth buffer is cleared to a farthest value, and the stencil buffer is cleared to 0's. Thereupon, the polygons of the image are rendered twice. In the first pass, all polygons are rendered by filling all pixels within their boundaries. At each pixel, only its depth value is modified by selecting the nearer of either the current depth value or the new depth value. This creates a depth image in the depth buffer. This depth image is used for occlusion detection so that only visible edges are displayed; those edges which are totally hidden or partially obscured behind another object are prevented from being displayed. In the currently preferred embodiment, a well-known pixel offset technique for biasing depth values is practiced for improved depth comparison accuracy. In the second pass, all the polygons are again rendered, this time by drawing lines from vertex to vertex for each of the polygons. The pixel values are modified only when the depth comparison passes (i.e., the pixel is visible and not occluded). Each time a particular pixel is modified, its corresponding stencil value is toggled from 0 to 1 or from 1 back to 0. Afterwards, the value of each pixel in the frame buffer is set to the line color if and only if its corresponding stencil value is 1. Lastly, all true edges are rendered. For the true edges, only those pixels which pass the depth comparison are modified by setting them to the line color. In the end, only the visible true edges and silhouette edges are drawn for display.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
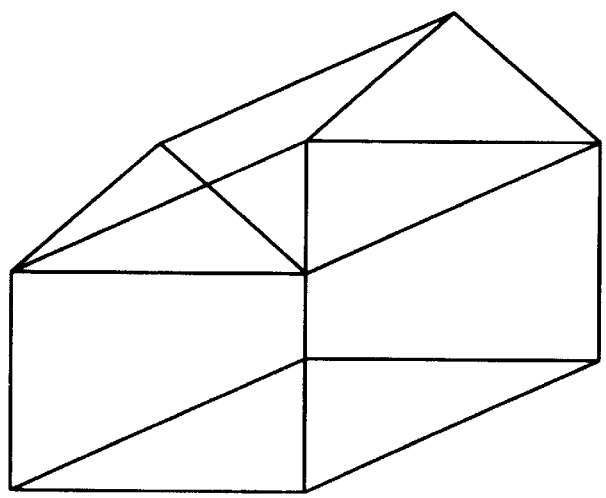
FIG. 1(A) shows all of the lines corresponding to a simple line drawing of a house.
Figure 1B:
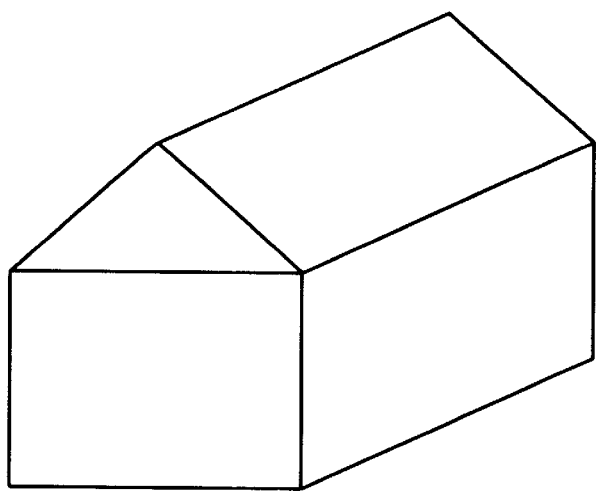
FIG. 1(B) shows the same line drawing, except that all "hidden" lines have been removed.
Figure 2A:
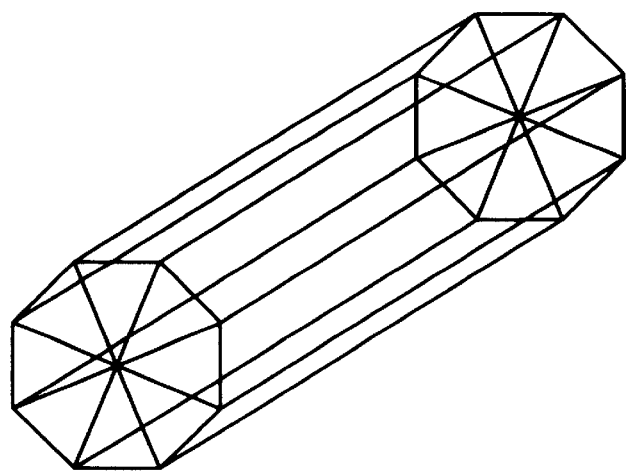
FIG. 2(A) depicts how a cylinder is modeled by defining a number of facets.
Figure 2B:
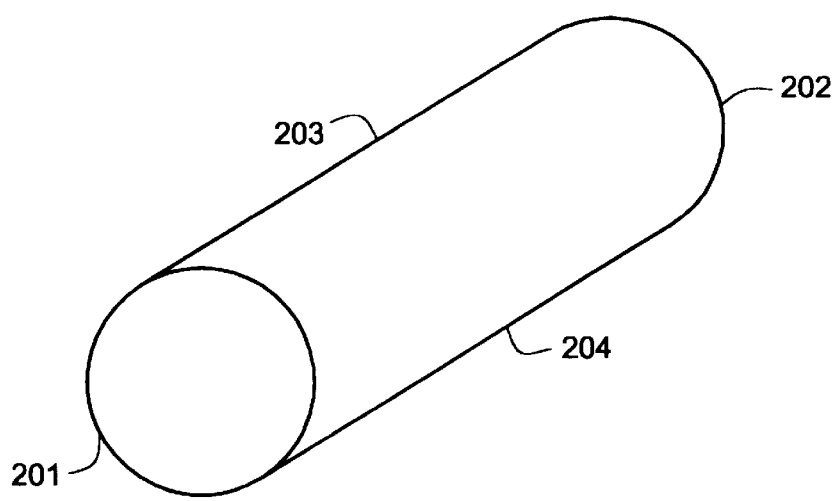
FIG. 2(B) shows a clearer hidden-line drawing of a cylinder.

A method for interactively rendering high-quality computer generated silhouette images is described. The present invention accurately identifies and displays only true edges and silhouette edges which are visible. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. The following description sets forth a way for identifying visible facet edges, removing edges which are hidden or obscured behind another object, and identifying silhouette edges. Lastly, an integrated process for performing all these functions for generating a line drawing whereby only visible silhouette and true edges are drawn for display is presented.

The present invention can be practiced on any proper solid (i.e., solids whose faceted surface is complete and has no holes). Furthermore, the present invention may be practiced on non-proper solids as well. Each facet of such a solid is rendered as lines, rather than filled in the traditional shaded surface representation. In the currently preferred embodiment of the present invention, only visible facets are considered for display. There are numerous ways for determining which facets are visible and which are hidden. For purposes of this invention, any visible facet determination scheme can be used. For example, the visible/hidden facet determination can be accomplished by executing a backfacing facet elimination scheme. In a backfacing facet elimination scheme, each vertex of each polygon is numbered in either a clockwise or counterclockwise orientation, depending on whether the facet is frontfacing or backfacing. For instance, frontfacing polygons are assigned vertices with a clockwise numbering rotation. It does not matter which vertex is numbered first, as long as the vertices are numbered in an ascending order based on a clockwise orientation. In contrast, the vertices corresponding to backfacing facets are numbered in an ascending order based on a counterclockwise orientation. By examining the orientations, the graphics system is able to distinguish between visible frontfacing and hidden backfacing facets. Hence, hidden facets and their corresponding edges can be eliminated. The remaining facet edges all belong to visible frontfacing facets.

It should be noted that the present invention does not need to have knowledge concerning whether a clockwise orientation indicates frontfacing or whether clockwise indicates backfacing. This feature of the present invention is important because many computer-aided design (CAD) databases contain objects whereby the polygons of any given object are assigned a consistent orientation, but not every object within a scene necessarily has the same orientation. In other words, one object may assign a clockwise orientation to indicate frontfacing; all polygons belonging to that object having a clockwise orientation would be frontfacing. Whereas, a second object may assign a clockwise orientation to indicate backfacing; all polygons belonging to the second object having a clockwise orientation would be backfacing. The reason for the incongruous orientation assignments between objects is because CAD drawings often duplicate a given object by using its mirror image. Using a mirror image duplicate is more efficient than re-creating the object. However, the mirror image object would necessarily have a different orientation than that of the original object. An explanation of why the present invention works, regardless of the orientation of a given object, will be presented below.

Figure 3:
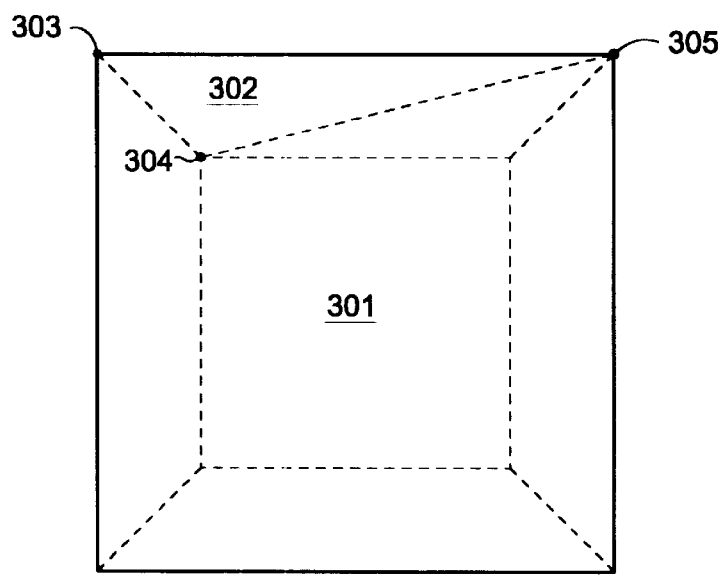
FIG. 3 shows a polygonal representation of a three-dimensional cube.

But first, a simple example is presented to demonstrate the backfacing facet edge removal process. Referring to FIG. 3, a three-dimensional cube 301 is shown. Cube 301 is comprised of six sides, each of which is represented by a pair of ninety degree triangles. However, only the side closest to the viewer is visible; the other five sides are obstructed from view. The ten triangles comprising the five hidden sides are backfacing. They are identified by examining the orientation of their respective vertices. For example, triangle 302 has three vertices 303–305 respectively designated as 1, 2, and 3. The counterclockwise orientation indicates that triangle 302 is backfacing. As such, its three edges are eliminated. In contrast, the closest side is comprised of two triangles with a clockwise orientation. This identifies the two triangles as being visible. Hence, their edges are not eliminated.

Figure 4:
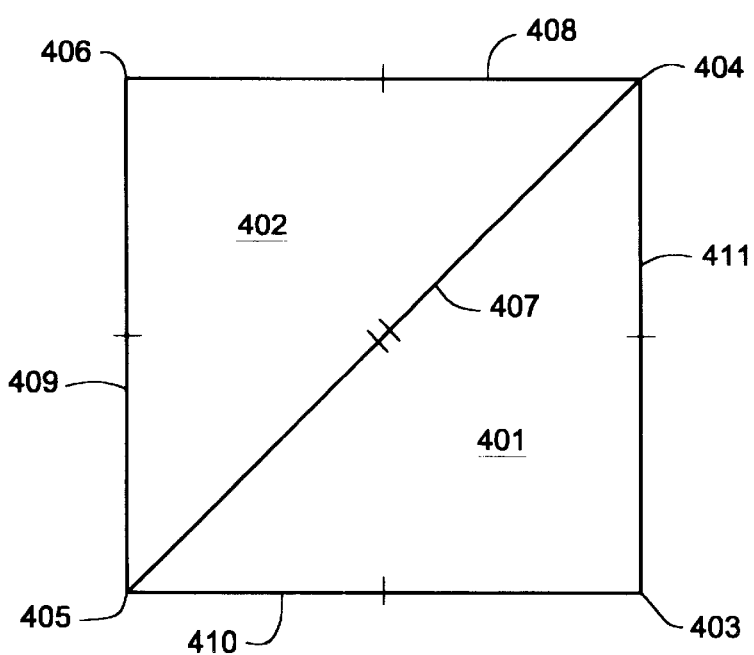
FIG. 4 shows the visible front face of the cube and the number of times each edge is rendered.

Not only are backfacing edges eliminated, but also inconsequential edges separating adjoining facets must be likewise removed. For example, FIG. 4 shows the visible front face of the block discussed above. It can be seen that the front face is comprised of two polygons 401 and 402. Polygon 401 has vertices 403–405, and polygon 402 has vertices 404–406. Edge 407 is inconsequential and must be removed. It has been discovered that inconsequential edges separating adjoining facets are rendered twice, whereas the silhouette edges of a facet are rendered only once. For example, 408–411 are rendered exactly once. However, inconsequential edge 407 is rendered twice. Hence, the graphics subsystem can identify which of the facet edges are silhouette edges and which are inconsequential edges by tracking the number of times each particular edge is rendered. In the end, only the silhouette edges are rendered, and inconsequential edges are eliminated.

Figure 5:
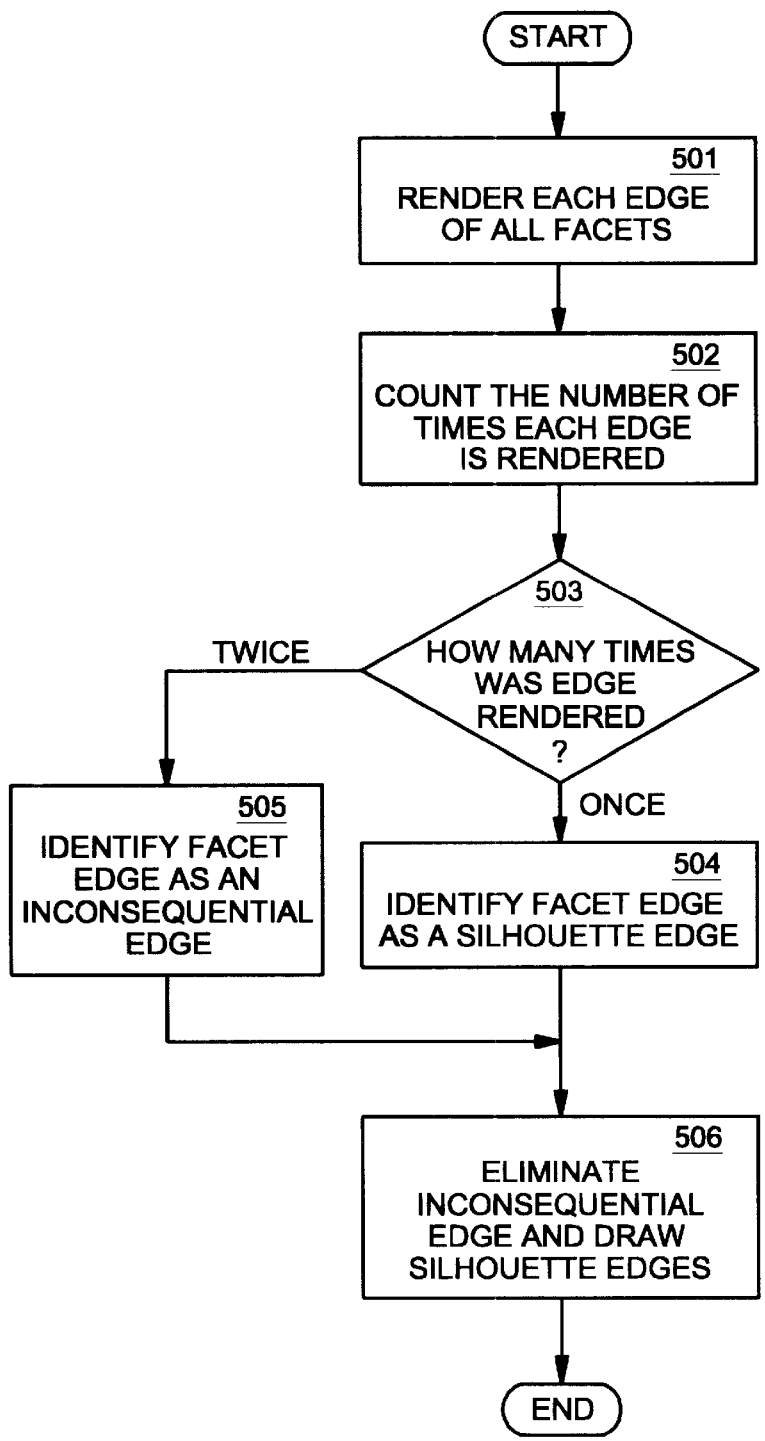
FIG. 5 is a flowchart describing the process for identifying and eliminating inconsequential edges.

FIG. 5 is a flowchart describing the process for identifying and eliminating inconsequential edges. First, each edge of all the facets is rendered, step 501. Next, the computer counts the number of times a particular edge is rendered, step 502. A determination is then made in step 503 as to how many times each edge has been rendered. If an edge is rendered only once, it is designated as being a silhouette edge, step 504. If an edge is rendered twice, it is designated as being an inconsequential edge, step 505. All inconsequential edges are eliminated, and all silhouette edges are drawn, 506.

Besides eliminating backfacing edges, hidden surfaces and/or lines which are occluded behind an opaque object can be eliminated. There are a number of different ways for accomplishing hidden line removal. Standard Z buffering and occlusion culling techniques can be used. In the currently preferred embodiment, a standard Z or "depth" buffering technique is used to build a depth image. This depth image is used to identify the nearer, visible pixel values. Unfortunately, however, line drawings and polygon rendering do not necessarily produce the same Z values for pixels. This problem is addressed by implementing a well-known pixel offset process, such as the glPolygonOffset command found in the OpenGL software interface (see Woo M., Neider J., and Davis T., OpenGL Programming Guide, second edition, The Official Guide to Learning OpenGL, Version 1.1, Addison-Wesley Developers Press, 1997, which is incorporated by reference herein as background material). In a pixel offset process, the Z value for each pixel is biased back by an amount that is proportional to the depth slope of the polygon. Conversely, one could bias the lines forward rather than biasing the polygons back. In either case, the pixel offset technique solves, for the most part, the discrepancies in Z values. Thereby, those edges and portions of edges which are hidden behind another object are not drawn for display.

Figure 6:
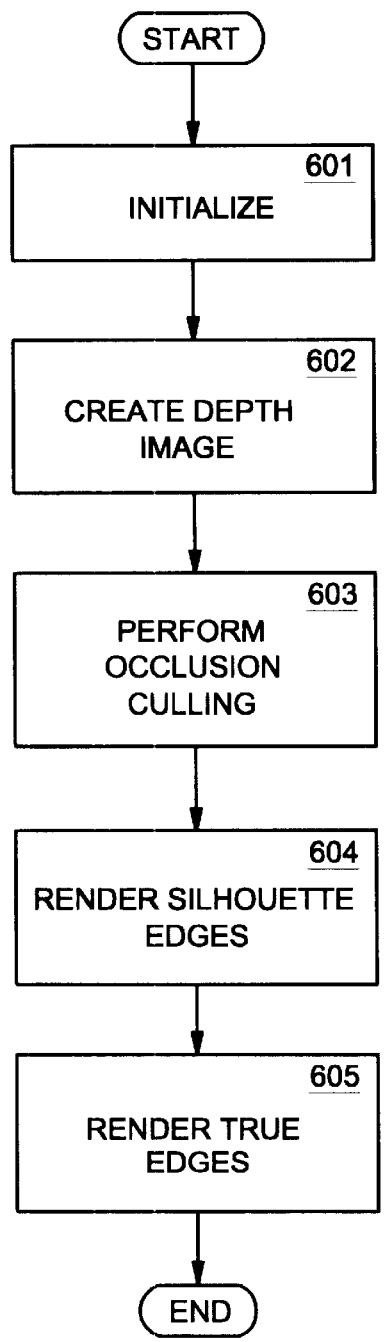
FIG. 6 is a flowchart describing the steps for performing a single coherent, integrated process is for rendering line drawings whereby only visible true edges and visible silhouette edges are drawn for display.

Now, a single coherent, integrated process is described for rendering line drawings whereby only visible true edges and visible silhouette edges are drawn for display, as shown in the flowchart of FIG. 6. First, the various buffers are initialized, step 601. Next, a depth image is created, step 602. This depth image is used to perform occlusion culling which eliminates all hidden lines, step 603. Thereupon, the visible silhouette edges are identified and rendered for display, step 604. Finally, the visible true edges are rendered for display, step 605.

Figure 7:
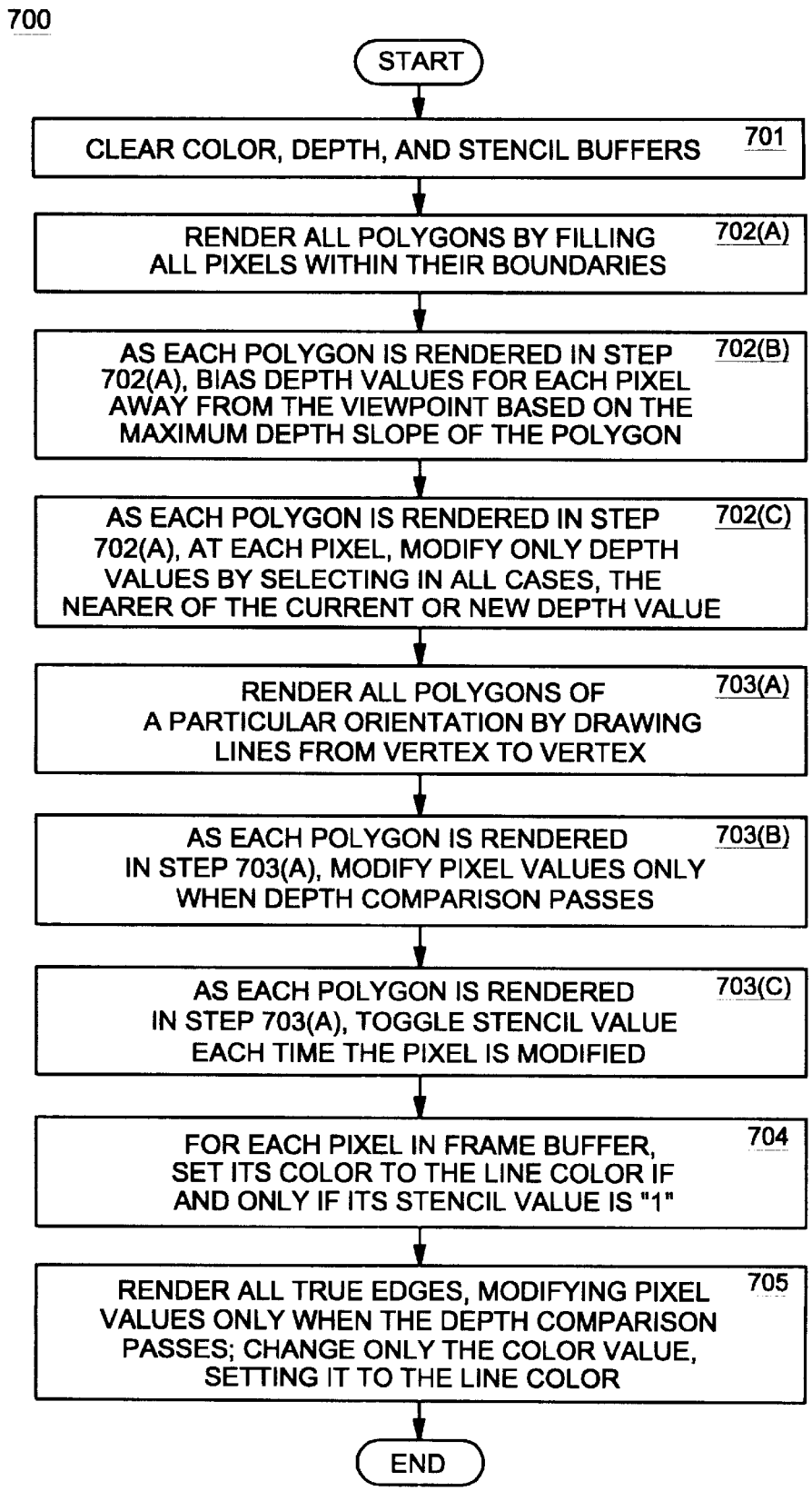
FIG. 7 is a flowchart describing in detailed the steps for performing the currently preferred embodiment of the present invention.

FIG. 7 is a flowchart describing in detailed the steps for performing the currently preferred embodiment of the present invention. Initially, the color, depth, and stencil buffers are cleared, step 701. Color and depth buffers are well known in the computer graphics art. (See, for example, Foley and vanDam, Computer Graphics: Principles and Practice, Second Edition, Addison-Wesley, 1990). The stencil buffer is described extensively in U.S. Pat. No. 5,266,941, entitled "Apparatus And Method For Controlling Storage Of Display Information In A Computer System." The color buffer is cleared to the background color. The depth buffer is cleared to the farthest Z value. And the stencil buffer is cleared to all 0's. After all buffers have been initialized, the process performs a first rendering pass according to steps 702(A)–702(C). Step 702(A) renders all polygons by filling all pixels within their boundaries. As each polygon is rendered in step 702(A) and during this filling process, the depth value for each pixel is biased away from the viewpoint based on the maximum depth slope of the polygon, step 702(B). Furthermore, as each polygon is rendered in step 702(A) and at each pixel, only the depth value for that particular pixel is modified by selecting in all cases, the nearer of either the current depth value or the new depth value, step 702(C). This essentially creates a depth image, also commonly referred to as a "height field." The depth image is used to perform depth comparisons for occlusion culling.

A second rendering pass is then performed in steps 703(A)–703(C), whereby all polygons are rendered again. This time, the polygons of one particular orientation (e.g., either clockwise or counter-clockwise) are rendered by drawing lines from vertex to vertex, step 703(A). This algorithm works properly, regardless of the particular orientation, provided that all polygons of a given object having that particular orientation are rendered in this second rendering pass. Furthermore, as each polygon is rendered in step 703(A), pixel values are modified only when the depth comparison passes, step 703(B). The stencil buffer is set in a mode, whereby each time a pixel value is modified, its corresponding stencil value is toggled (e.g., from 0 to 1 or from 1 back to 0), step 703(C). For each pixel in the frame buffer, its color is set to the line color if and only if its stencil value is "1," step 708. Otherwise, the pixel remains set to the background color. Finally, all true edges are rendered, provided that pixel values of the true edges are changed to the line color only if it passes the depth comparison, step 709. The true edges are specified by another application (e.g., a user specifies all real edges of an initial design as part of a CAD/CAM program).

It should be noted that each time frame buffer values are changed due to changes in the scene (e.g., change in the viewpoint), the steps described in the above flowchart are executed. Thereby, the correct hidden-line drawing is rendered in real-time. Any changes made by the user (e.g., rotate, enlarge, move, pan, etc.) are instantly reflected as the object is rendered. As a result, the present invention allows the display of highly accurate hidden-line drawings on an interactive basis.

Furthermore, as stated above, the present invention works, regardless of the designated orientation and also regardless of whether the designated orientation corresponds to frontfacing or backfacing. The only stipulation is that in the second rendering pass, once a particular orientation is designated, all polygons and only those polygons comprising a given object which have that particular orientation, are rendered (by drawing lines from vertex to vertex) in step 703(A). If, for instance, a clockwise orientation is designated in step 703(A), then all polygons and only those polygons having a clockwise orientation for that object are rendered a second time in step 703(A). Polygons which have a counterclockwise orientation are not rendered the second time in step 703(A). Suppose that clockwise corresponds to frontfacing. In this case, only pixels belonging to silhouette edges have stencil values of 1 as they are rendered only once; the pixels of inconsequential edges will have their stencil values toggled back to 0 as they are rendered twice. Thus, only the visible, non-occluded silhouette edges are ultimately drawn for display according to step 703(B) and step 704. Now, suppose instead that clockwise corresponds to a backfacing situation. In this case, only those pixels which will have their stencil values toggled at all are the ones associated with the silhouette edges. Pixels belonging to inconsequential edges will have stencil values of 0 because all stencil values were initially cleared to 0 in step 701. Again, just as before, only the pixels belonging to silhouette edges will have stencil values of 1, and the pixels of inconsequential edges will have stencil values of 0. The end result is the same—only visible, non-occluded silhouette edges are ultimately drawn for display according to steps 703(B) and 704. Lastly, the visible, non-occluded true edges are drawn added in step 705. Moreover, it logically follows that the reverse holds true if a counterclockwise orientation were used in step 703(A). But the same outcome would be achieved in that pixels of silhouette edges would have stencil values of 1 (i.e., toggled once and only once), and pixels of inconsequential edges would have stencil values of 0 (i.e., either toggled twice or not toggled at all). Therefore, the present invention works, regardless of the orientation, provided that the same orientation is applied to a given object.

Figure 8:
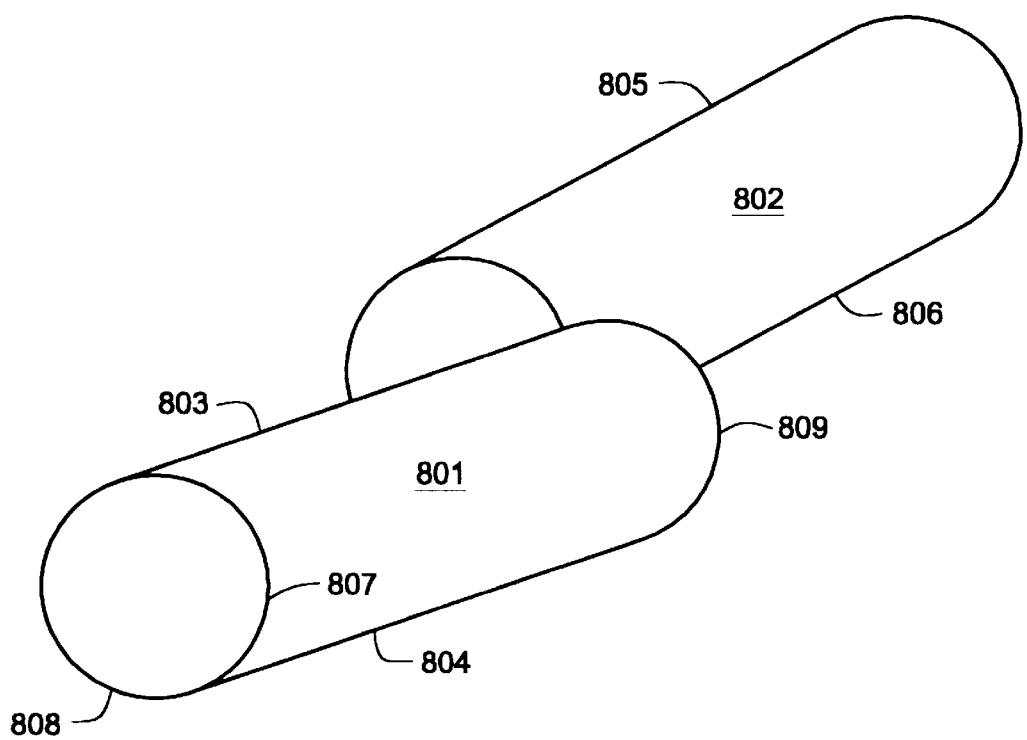
FIG. 8 shows an exemplary line drawing as may be generated by the present invention.

FIG. 8 shows an exemplary line drawing as may be generated by the present invention. Two cylinders 801 and 802 are shown. Note that the silhouette edges 803–804 of cylinder 801 and the silhouette edges 805–806 are drawn. However, the inconsequential facet edges of the polygons used to form the curved bodies of cylinders 801 and 802 are not drawn for display. The left end of cylinder 801 is represented by two semi-circles 807 and 808. Semi-circles 807 and 808 are real edges, and hence, are drawn for display. Note that semicircle 808 is also a silhouette edge. As such, semicircle 808 is drawn twice—once as being a true edge and a second time as being a silhouette edge. However, there is no difference visually between lines drawn once and those drawn twice. Semi-circle 807 is only a real edge and not a silhouette edge. Also, note that cylinder 801 is in front of cylinder 802. A portion of cylinder 802 is behind cylinder 801. This portion is hidden from the viewer and should not be drawn. The depth comparison described above is used to perform occlusion culling on the hidden portion. This hidden portion of the left end of cylinder 802 does not pass the depth comparison. Hence, the effected pixels remain having the background color. Likewise, the portion of silhouette edge 806 which is hidden behind cylinder 801 is culled. Thus, a simple, accurate line drawing is displayed. Only the visible, non-hidden real edges and non-hidden silhouette edges are appropriately drawn for display.

Figure 9:
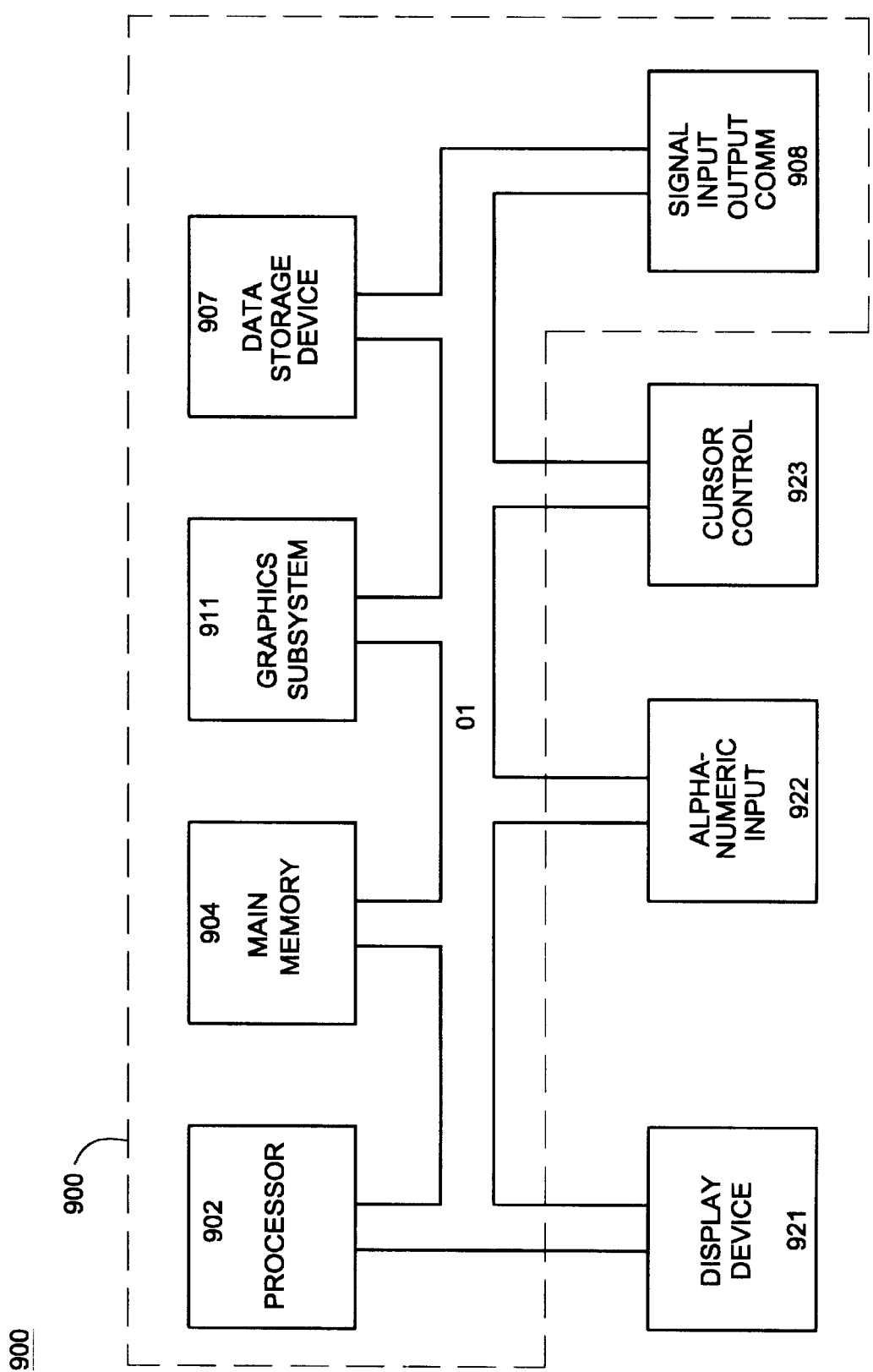
FIG. 9 shows a computer graphics system upon which the present invention may be practiced.

Referring to FIG. 9, a computer graphics system upon which the present invention may be practiced is shown as 900. System 900 can include any computer controlled graphics systems for generating complex or three-dimensional images. Computer system 900 comprises a bus or other communication means 901 for communicating information, and a processing means 902 coupled with bus 901 for processing information. System 900 further comprises a random access memory (RAM) or other dynamic storage device 904 (referred to as main memory), coupled to bus 901 for storing information and instructions to be executed by processor 902. Main memory 904 also may be used for storing temporary variables or other intermediate information during execution of instructions by processor 902. Data storage device 907 is coupled to bus 901 for storing information and instructions. Furthermore, an I/O device 908 is used for couple the computer system 900 onto a network.

Computer system 900 can also be coupled via bus 901 to an alphanumeric input device 922, including alphanumeric and other keys, is typically coupled to bus 901 for communicating information and command selections to processor 902. Another type of user input device is cursor control 923, such as a mouse, a trackball, or cursor direction keys for communicating direction information and command selections to processor 902 and for controlling cursor movement on display 921. This input device typically has two degrees of freedom in two axes, a first axis (e.g., x) and a second axis (e.g., y), which allows the device to specify positions in a plane.

Also coupled to bus 901 is a graphics subsystem 911. Processor 902 provides the graphics subsystem 911 with graphics data such as drawing commands, coordinate vertex data, and other data related to an object's geometric position, color, and surface parameters. The object data is processed by graphics subsystem 911 in the following four pipelined stages: geometry subsystem, scan conversion subsystem, raster subsystem, and a display subsystem. The geometry subsystem converts the graphical data from processor 902 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and anti-aliasing functions are performed. The resulting pixel values are stored in a frame buffer. The display subsystem reads the frame buffer and displays the image on display monitor 921.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating a three-dimensional line drawing of an object, comprising the computer implemented steps of:

initializing a color buffer and a depth buffer;

creating a depth image stored in the depth buffer;

rendering a plurality of polygons by drawing lines between vertices of the polygons, wherein pixels corresponding to the lines are modified if the pixels pass a depth comparison according to the depth image;

setting a mode of operation for toggling a bit each time the pixel value in the frame buffer is changed to determine the number of times the pixel has been rendered;

changing a pixel value in a frame buffer to a line color according to the number of times the pixel has been rendered according to the toggling of the stencil buffer.

2. The method of claim 1, wherein the step of creating the depth image is comprised of the steps of:
rendering the polygons by filling pixels corresponding to the polygons;
biasing depth values for the pixels as a function of depth slopes of corresponding polygons.

3. The method of claim 2, wherein the depth buffer is initialized to a farthest depth value and the depth image is created by selecting between the nearer of either an existing depth value or a new depth value.

4. The method of claim 1 further comprising the step of:
setting a mode of operation for toggling a stencil buffer each time the pixel value in the frame buffer is changed to determine the number of times the pixel has been rendered.

5. The method of claim 1 further comprising the step of:
changing pixel values corresponding to a true edge of the object to the line color if the pixel values of the true edge pass the depth comparison.

6. In a display system, a method for generating a line drawing corresponding to an object, wherein only true edges and silhouette edges of the object which are visible are displayed, comprising the steps of:
setting a color buffer to a background color;
setting a depth buffer to a depth value corresponding to a distance that is farthest away from a view point;
performing occlusion culling;
rendering pixels of a plurality of polygons corresponding to the object;
determining a number of times each of the pixels has been rendered by toggling a bit each time the pixel is rendered, wherein the bit is toggled from one to zero or from zero back to one;
setting pixels which have been rendered a particular number of times to a predetermined color;
modifying pixels of the true edges which have not been culled;
drawing the pixels in the frame buffer.

7. The method of claim 6 further comprising the step of performing depth aliasing.

8. The method of claim 6 further comprising the step of toggling a stencil buffer to determine the number of times the pixel has been rendered.

9. The method of claim 6, wherein frame buffer values corresponding to the line drawing are updated in real-time.

10. The method of claim 6 further comprising the step of performing a signed area calculation of projected vertexes of a facet to determine whether the facet faces the viewpoint.

11. A method for rendering a computer-generated hidden-line drawing, comprising the steps of:
processing an unfilled proper solid into a plurality of polygons;
determining whether pixels of the polygons is visible or hidden;
determining a number of times pixels corresponding to a non-hidden edge is rendered;
setting a mode of operation for toggling a stencil buffer each time the pixel value in the frame buffer is changed to determine the number of times the pixel has been rendered;
modifying the pixels corresponding to the non-hidden edge according to the number of times the pixels of the non-hidden edge was rendered;
drawing the pixels of the non-hidden edge which were modified.

12. The method of claim 11 further comprising the steps of:
identifying real edges separating two different surfaces of the solid;
displaying the real edges.

13. The method of claim 11, wherein the step of determining whether each of the facets is visible or hidden is performed according to a backfacing facet elimination scheme in which polygons facing a viewer are designated with a first vertex orientation and polygons facing away from the viewer are designated with a different vertex orientation.

14. The method of claim 11, wherein the step of determining the number of times an edge is rendered is performed by initially clearing a buffer and toggling a bit stored in a buffer each time a corresponding pixel is rendered.

15. The method of claim 11 further comprising the step of executing depth biasing.

16. The method of claim 11, wherein hidden-line drawings of the object are generated interactively.

17. A computer readable memory having instructions stored thereon for generating a three-dimensional line drawing, the instructions comprising computer implemented steps of:
initializing a plurality of buffers;
creating a depth image for occlusion detection;
rendering silhouette edges with occlusion detection;
rendering true edges with occlusion detection;
clearing a color buffer to a background color;
clearing a depth buffer to a farthest value;
clearing a stencil buffer to zero;
rendering all polygons of an object by filling all pixels within the polygons;
biasing depth values of the pixels away from a viewpoint based on a maximum depth slope of the polygons;
modifying depth values of the pixels by selecting the nearer of either a depth value currently stored in the depth buffer or a new depth value;
rendering all polygons of a particular orientation by drawing lines from one vertex to another vertex;
modifying pixel values only if the pixels pass depth comparison;
setting the stencil buffer to a mode which causes a stencil value to toggle each time a corresponding pixel value is modified;
setting pixel values in the frame buffer to a specified color value according to stencil values stored in the stencil buffer;
modifying pixel values of true edges of the object if the pixels passes the depth comparison;
displaying an image according to color values stored in the frame buffer.

18. The computer readable memory of claim 17, wherein the instructions further comprise the steps of:
clearing a color buffer to a background color;
clearing a depth buffer to a farthest value;
clearing a stencil buffer to zero;
rendering all polygons of an object by filling all pixels within the polygons;
biasing depth values of the pixels away from a viewpoint based on a maximum depth slope of the polygons;
modifying depth values of the pixels by selecting the nearer of either a depth value currently stored in the depth buffer or a new depth value;
rendering all polygons of a particular orientation by drawing lines from one vertex to another vertex;
modifying pixel values only if the pixels pass depth comparison;

setting the stencil buffer to a mode which causes a stencil value to toggle each time a corresponding pixel value is modified;

setting pixel values in the frame buffer to a specified color value according to stencil values stored in the stencil buffer;

modifying pixel values of true edges of the object if the pixels passes the depth comparison;

displaying an image according to color values stored in the frame buffer.

* * * * *